United States Patent [19]
Grib

[11] 3,937,117
[45] Feb. 10, 1976

[54] COMPOSITE TUNING FORK AND METHOD OF MAKING SAME

[75] Inventor: Boris F. Grib, Huntington, N.Y.

[73] Assignee: Philamon Incorporated, Farmingdale, N.Y.

[22] Filed: Dec. 29, 1971

[21] Appl. No.: 213,662

Related U.S. Application Data

[62] Division of Ser. No. 839,928, July 8, 1969, Pat. No. 3,632,192.

[52] U.S. Cl............... 84/454; 310/25; 58/23 TF
[51] Int. Cl.² ........................................ G10G 7/02
[58] Field of Search............ 58/23 TF; 29/169.5; 84/1.14, 1.15, 454, 457, 409, 402; 310/25, 36; 350/269, 272; 356/26

[56] References Cited
UNITED STATES PATENTS

| | | | |
|---|---|---|---|
| 373,118 | 11/1887 | Wood | 29/169.5 X |
| 2,152,955 | 4/1939 | Coyne | 310/25 X |
| 2,957,062 | 10/1960 | Bopp | 310/25 X |
| 3,418,417 | 12/1968 | Rhodes | 84/1.15 |

Primary Examiner—George H. Miller, Jr.
Assistant Examiner—U. Weldon
Attorney, Agent, or Firm—Robert R. Keegan

[57] ABSTRACT

There is disclosed a light modulating structure including an open-ended housing within which an electromagnetically driven tuning fork structure is supported. The tuning fork is of composite construction including two L-shaped cross section elements and is manufactured by a method which involves shaping the tines portions of the elements to a desired thickness in a single machining operation before the elements are separated and joined together symmetrically at the toe of the L to form a composite tuning fork.

10 Claims, 3 Drawing Figures

COMPOSITE TUNING FORK AND METHOD OF MAKING SAME

This application is a division of co-pending application Ser. No. 839,928, filed July 8, 1969, in the name of Boris F. Grib, for Tuning Fork Light Modulator (now U.S. Pat. No. 3,632,192).

The present invention relates generally to electrically driven tuning fork structures and more specifically to a composite tuning fork structure employed in a light modulator or the like and a method of making same.

Tuning fork structures are known to the art wherein electromagnetic flux induced in predetermined paths causes the tines to have sustained vibration with controllable amplitudes. Tuning forks are presently formed in various ways such as by milling or otherwise machining a central slot through a solid bar of magnetic material, thereby defining a pair of tines of nearly identical shape and size. In many cases the volume of material actually removed from the solid bar to form the tines to nearly identical dimensions exceeds the volume of material of the finished piece.

The use of this procedure, coupled with the fact that close tolerance machining is required, presents substantial difficulties particularly in view of the fact that it is of great importance that the two tines of a tuning fork be balanced and in particular be of precisely similar stiffness. Tuning fork tine stiffness varies as the third power of the thickness so that the tolerance acceptable in forming (particularly low frequency thin-tined) tuning forks is exceedingly small as it relates to any difference in thickness between the respective tines of a tuning fork.

Accordingly, it is an object of the present invention to provide a method of forming the tines of a composite tuning fork which substantially reduces the cost of such fork structures and permits practical production of lower-frequency higher-accuracy forks.

According to one embodiment of this invention, a light modulator includes a cylindrical housing extending from a closed end to an open output end. A support member which is supported by the walls of the housing, in turn supports an electromagnetically driven tuning fork structure located within the housing. The tuning fork structure includes a channel-shaped base platform which is bolted to the support member. A tuning fork having a pair of tines, a tine junction portion and a heel portion is secured to the base platform.

The tuning fork tines employed in the aforedescribed modulator structure are formed in halves according to the present invention. Rather than mill a central slot through a solid bar as has commonly been done, a member of substantially uniform generally L-shaped cross section is formed, such as by machining, with a relatively thick portion of material adjacent a relatively thin portion. Both the thick and thin portions are bounded by a common base plane. A series of slices or cuts are thereafter made through the member along parallel equally spaced planes perpendicular to the base plane and which extend parallel to the ultimate longitudinal axis of the thin portion. In this way, a plurality of precisely similar tine halves are separated from the elongated member, each of which is interchangeably suited for assembly with another to form a tuning fork.

Other advantages of the invention will be understood from the following description of specific embodiments of the invention together with the accompanying drawing, wherein similar reference characters denote similar elements throughout the several views, and in which.

Figure 2:
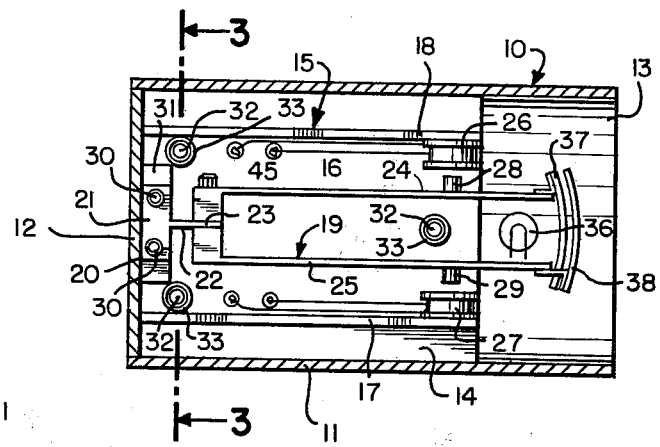
FIG. 2 is a plan view of a light modulator according to the invention employing the tines shown in FIG. 1.
Figure 3:
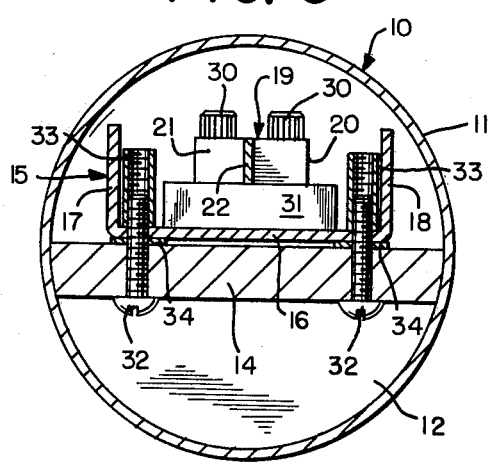
FIG. 3 is a sectional elevational view taken along the line 3—3 of FIG. 2.

Referring now in more detail to the drawing, FIGS. 2-3 illustrate a light modulator 10 as including a tubular housing 11 which extends between an end closed by end plate 12 and open end 13. A support member 14, made, for example, from aluminum, is supported within housing 11.

A tuning fork assembly 15 is supported upon member 14, and includes a base platform 16 having upturned flanges 17 and 18 which extend parallel with respect to the axis of housing 11.

A tuning fork itself 19 includes a heel portion 20 formed by a tee-shaped member 21 which is independently machined from one or more pieces of magnetic alloy stock. Member 21 is formed with a web 22 extending between heel portion 20 and a tine junction portion 23 of fork 19. A pair of tines 24 and 25, in turn, extend from the tine junction portion to their free ends.

Adjacent the end of tine 24 is a drive coil 26 supported by flange 18. A substantially identical pickup coil 27 is supported by flange 17 adjacent the end of tine 25. Permanent magnets 28 and 29 are secured to tines 24 and 25, respectively, immediately adjacent coils 26 and 27.

The function of coil 26 is to drive the tuning fork 19 through the medium of its tine 24. One function of pickup coil 27 is to produce an output signal corresponding to the vibration of tuning fork tine 25 (and hence of the tuning fork) which may be amplified and supplied as an alternating current to coil 26 in proper phase to sustain the vibration of the tuning fork. Numerous forms of drive circuits for electrically driven tuning forks are available for use with the light modulator and, since the particular form of such circuit does not represent any part of the present invention, these circuits will not be discussed in detail here.

The mechanical coupling of tuning fork 19 to base platform 16 is effected by socket headed bolts 30 which secure heel portion 20 of member 21 to a heel pad 31. Heel pad 31 is preferably silver brazed to base platform 16. The coupling of base platform 16 to support member 14 is accomplished with bolts 32, the heads of which bear against the underside of member 14. Bolts 32 extend through member 14 and base 16 to sleeves 33 which are formed with internal threads adapted to matingly engage these bolts.

Mounting pads 34 formed from stainless steel separate the base from member 14. Pads 34 are preferably silver brazed to the underside of base 16 prior to assembly. A light source 36, such as an incandescent lamp of conventional type, is shown in FIG. 2 located between tines 24 and 25. Shutter members 37 and 38 formed with apertures therethrough are secured to the free ends of tines 24 and 25.

In operation, upon energization of the tuning fork drive circuit, tines 24 and 25 will vibrate with the result that the effective opening formed by the apertures through which light from light source 36 may pass will vary.

Figure 1:
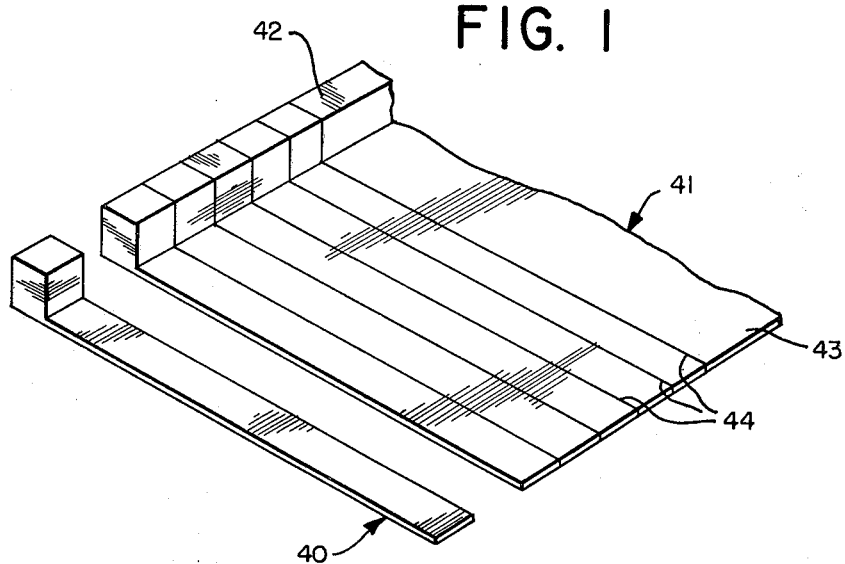
FIG. 1 is a fragmentary perspective view illustrating the formation of tuning fork tines according to the present invention.

Looking now at FIG. 1, a plurality of tuning fork halves 40 are shown. In accordance with this invention, a method is provided to efficiently and accurately fabricate a composite tuning fork for use in the modulator already described, as well as for use in other apparatus incorporating tuning forks, particularly low frequency tuning forks. An elongated member 41 is machined as one piece with a cross section corresponding to the desired cross section of approximately one-half of a tuning fork tine. A relatively thick junction portion 42 is formed adjacent a relatively thin sheet-like portion 43. A series of slices or cuts are thereafter made along parallel planes (designated reference character 44) with the result that halves 40 of precisely similar shape and size are formed. Alternatively, the members 41 may be sliced before they are simultaneously machined to the same thickness.

Halves 40 are used to form the tines of a tuning fork, such as tuning fork 19, for example, by rigidly securing the bases of these halves together and to the extremity of web 22 by means of a socket headed bolt 45.

The advantages of the method of fabrication described and the resulting composite tuning fork are remarkable and by no means superficially apparent.

It first must be kept in mind that the characteristics of the tuning fork in applications of the sort concerned here are of critical importance. It is not only the physical characteristics such as mass, dimension stiffness, etc. which are important, but also magnetic characteristics and temperature characteristics and the interrelations between various ones of these sets of characteristics.

The optical modulator illustrated in FIGS. 2 and 3 is an example of a tuning fork device requiring a tuning fork with a low frequency and a substantial excursion of the tuning fork tines. While it is possible to lower the frequency of tuning forks by either increasing the tine mass or decreasing the tine stiffness, the former approach has basic disadvantages which cannot be overcome. Increasing the tine mass also fails to contribute adequately to the objective of wide excursion for the tuning fork tines.

It will, therefore, be understood that certain tuning fork applications such as the one illustrated herein inherently demand that the tuning fork tines have a low stiffness characteristic. To provide low stiffness, the tuning fork tines should be made quite thin.

Consider a situation such as the one at hand wherein the dimensions of the tuning fork are substantially as follows: total length of tine and tine junction 2.51 inches, length of tine along 2.33 inches, width of tine 0.22 inches, thickness of tines 0.012 inches, width of web 0.22 inches, thickness of web 0.012 inches, length of web 0.18 inches, separation between tines 0.46 inches.

Considering the above dimensions and referring to the drawing, it will be noted that prior approaches to tuning fork fabrication involving milling a slot in a solid member to form two separated tines of nearly identical stiffness present substantial difficulty. The slot-milling procedure has been successfully employed in cases where the tuning fork tines were of substantial thickness amounting to perhaps several hundredths of an inch. The practical accuracy of machining operations of this type is not related to the thickness of the tine but is some absolute value on the order of 0.0001 inch. Clearly, then, the thinner the tuning fork tine, the greater is the percentage error in its thickness which may be expected from unavoidable limitations on machining accuracy. In the slot-milling operation, the problem is aggravated by the fact that an error in the placement of the milled slot causes one tine to be thicker and the other tine to be thinner, substantially increasing the discrepancy between the two tuning fork tines.

It should be mentioned that the resonant frequency relation between the two tuning fork tines which is primarily governed by the tine thickness represents a critical factor in the manufacturing operation. Differences in the mass of either or both tines from the desired value can be rather easily corrected by adding or removing material from the end portion of the tines. However, any substantial difference between the natural frequency of one of the tines and the natural frequency of the other of the tines due to different stiffnesses renders the tuning fork unusable for most purposes.

One might assume that a very simple solution to this problem would be to form a composite tuning fork in which reeds of uniform cross section (which might be cut from the same piece of sheet stock of highly uniform thickness) were attached by brazing, welding, riveting or the like to a common tine junction structure in the form of a block. Unfortunately, a structure of this type has never been found to have performance characteristics suitable for any but the crudest low accuracy applications. The problem with such an approach resides in the attachment of the long thin reed to the common tine junction portion of the fork.

Of the methods available to secure a long thin reed to a common tine junction, perhaps the strongest and most reliable involve brazing or silver soldering. Other procedures such as soft soldering techniques produce a joint which is quite weak in comparison with the ferrous alloys of which tuning forks are normally made. It should be noted that the stresses resulting from the flexing of the tines are concentrated at the place where the tines join the tine junction portion of the tuning fork. This places the maximum stresses at the exact location of the joint in the arrangement where a reed is secured to a common tine junction block.

Combined with the stress concentration in the joint, there is the added problem of fatigue in this area of stress concentration. Thus, where the tine is thin as in low frequency tuning forks, particularly those of small dimensions, a perfectly reliable joint between a tuning fork formed of a pair of reeds and a tine junction block is impossible to achieve in practice.

Only a minor failure in the joint of such an arrangement is required to destroy the high accuracy of frequency for which tuning fork resonators are normally employed. By way of example, if such a joint fractured or weakened to the extent that the tine became one thousandth of an inch longer in effective length and assuming that the tine was originally one inch in length, this would represent a change in tine length of one part in a thousand. However, since the frequency of the tuning fork is proportional to the square of the length of the tine, the error in frequency due to a one-thousandth of an inch fracture or the like would be one part in 500, an intolerable error in all usual tuning fork applications.

Another difficulty in securing a thin tine to a common tine junction resides in the fact that the stronger joining techniques such as silver soldering generally require a thickness of the joining material on the order of one one-thousandth of an inch which compares to the tine thickness of approximately five or ten thousandths of an inch. There will further be more or less of a fillet in the corner where the tine joins the tine junction block. The dimension of the fillet and of the bonding layer for the two tines of a tuning fork will inevitably be different, and since the contribution to fork characteristics of this bonding material is significant, the two tines will not be properly matched in stiffness.

As previously mentioned, stiffness unbalance is highly deleterious as it causes the fork to take on characteristics of a single reed in that the Q of a reed (or unbalanced fork) varies with the equipment mounting mass and mounting rigidity. The most basic desirable attributes of a tuning fork as compared with a vibrating reed or the like flow from the balance of the fork structure.

By forming an L-shaped structure in which the critical portions of the tine and the common tine junction are formed of a unitary body of material, the previously described problems with composite tuning forks are overcome by the present invention. The junction between the two halves of the tuning fork is provided at a longitudinal plane through the common tine junction portion of the tuning fork. It will be noted that in the example illustrated herein, it is convenient to place a web portion of the tuning fork structure between the tuning fork halves, thereby simultaneously resiliently supporting the tines relative to the tuning fork heel portion, but this is not essential to the basic principle involved. The web utilized here is an application of the invention described in Boris F. Grib U.S. Pat. No. 2,806,400.

It will be found that certain minimum dimensions for the tine junction portions 42 relative to the thickness of the tine portion 43 are desirable. Clearly, the width of the half tine junction should be substantially greater than the thickness of the tine itself. Otherwise, there is little difference between employing the integral tine-tine junction members as compared with simply fastening a reed as a tine onto a common tine junction block, which was previously explained to be a generally unsatisfactory procedure.

As a rule of thumb, one would wish to improve the characteristics of a tuning fork in regard to reliability, frequency stability and the like by a factor of 10, at least, relative to the characteristics for a fork assembled from separate reed-like tine portions and a tine junction portion. By this rule of thumb, it can be shown that the width of the junction portion 42 representing approximately half the width of the tuning fork (ignoring any width contributed by web 22) should be equal to or greater than approximately the cube root of ten times the tine thickness.

It also can be shown as a rule of thumb that the longitudinal length of the tine junction portion 42 should be equal to or greater than approximately the square root of ten times the tine thickness.

The above rules assume that the third dimension of the tine junction portion will be equal to the corresponding dimension of the tuning fork tine portion, and if this were not the case suitable adjustments in the rule would be necessary.

Assuming that the rules heretofore stated are followed, little difficulty will be encountered in joining the two members 41 to each other or to a web member to form a tuning fork with frequency stability beginning to approach that which would prevail if the entire tuning fork were formed from one homogeneous piece of material. Of course, increasing the size of the tine junction portion relative to the tine thickness even further will reduce the effect of joining together the halves of the tuning fork structure and more closely approach the characteristics of a completely homogeneous tuning fork.

While it is contemplated that tuning forks will in most cases be formed of metal alloys, this is not to be implied to be essential to the invention, and they may be formed of other natural or synthetic materials including but not limited to plastics or synthetic resins.

It should also be noted that while machining techniques for machining the tine portions of the members 41 to precisely similar thicknesses have been described, other forming methods providing members having precisely similar tine thicknesses may also be employed to provide members appropriately shaped to form substantially identical mirror image halves of a tuning fork structure.

It may further be noted that while the drawing illustrates the tuning fork halves with a moderately sharp corner where the tine joins the common tine junction, any desired radius can be provided here by appropriate selection of a machine tool cutter.

From the foregoing discussion, therefore, it will be seen that the composite tuning fork and the method of its construction effectively solves the problem of providing thin tuning fork tines of precisely similary thickness, at the same time avoiding critical deficiencies present in prior art composite tuning forks.

The embodiments of the invention particularly disclosed are presented merely as examples of the invention. Other embodiments, forms and modifications of the invention coming within the proper scope of the appended claims will, of course, readily suggest themselves to those skilled in the art.

What is claimed is:

1. A method of forming the tines and tine junction portion of a tuning fork structure, comprising the steps of forming a unitary member of generally L-shaped cross section in one plane with a relatively thick part and a relatively thin sheet-like part, separating similar portions of said elongated member bounded by equally spaced planes parallel to said one plane, each said portion comprising one of said tines and a tine-junction portion, and securing a pair of said similar portions in relatively immovable symmetrical relationship at the relatively thick parts thereof to form a rigid tine junction portion of said thick parts with said thin parts forming precisely similar tuning fork tines.

2. The method of forming a composite tuning fork comprising the steps of forming a pair of unitary, substantially homogeneous elements having a generally L-shaped longitudinal cross section, and rigidly joining said elements symmetrically at the toes of said L-shaped cross sections to form a U-shaped tuning fork structure.

3. A tuning fork having a pair of substantially parallel spaced tines joined at one end in a tine junction, comprising a pair of elements substantially unitary and homogeneous, each said element comprising a flexible tine part and a relatively rigid tine junction part, the flexible tine parts of said elements having precisely similar transverse cross sections, the relatively rigid tine junction parts of said pair of elements being substantially rigidly joined together.

4. A tuning fork having a pair of substantially parallel spaced tines joined at one end in a tine junction, comprising a pair of elements substantially unitary and homogeneous, each said element comprising a thin flexible tine part and a relatively thick rigid tine junction part, the relatively thick rigid tine junction parts of said pair of elements being substantially rigidly joined together, the dimension of said tine junction part perpendicular to the plane of said tine part being at least two times the thickness of said tine part, and the dimension of said tine junction part in a direction parallel to the longitudinal axis of the tine part being at least three times the thickness of said tine part.

5. A method of forming the tines and tine junction portion of a tuning fork structure, comprising the steps of forming a unitary member of generally L-shaped cross section in one plane with a relatively thick part and a relatively thin sheet-like part, separating similar portions of said elongated member bounded by equally spaced planes parallel to said one plane, each said portion comprising one of said tines and a tine junction portion, and securing to opposite sides of a web extending from a base member a pair of said similar portions in relatively immovable symmetrical relationship at the relatively thick parts thereof to form a rigid tine junction of said thick parts with said thin parts forming precisely similar tuning fork tines.

6. A method of forming a tuning fork structure, comprising the steps of forming a unitary member of generally L-shaped cross section in one plane with a relatively thick part and a relatively thin sheet-like part, separating similar portions of said elongated member bounded by equally spaced planes parallel to said one plane, each said portion comprising one of said tines and a tine junction portion, securing to opposite sides of a web extending from a base member a pair of said similar portions in a relatively immovable symmetrical relationship at the relatively thick parts with said thin parts forming precisely similar tuning fork tines, and securing said base member to a tuning for platform.

7. A tuning fork having a pair of substantially parallel spaced tines joined at one end in a tine junction, comprising a pair of elements substantially unitary and homogeneous, each said element comprising a flexible tine part and a relatively rigid tine junction part, the dimension of said tine junction part perpendicular to the plane of said tine part being at least two times the thickness of said tine part, and the dimension of said tine junction part in a direction parallel to the longitudinal axis of the tine part being at least three times the thickness of said tine part, the flexible tine parts of said elements having precisely similar transverse cross sections, the relatively rigid tine junction parts of said pair of elements being substantially rigidly joined together.

8. The method of forming a composite tuning fork comprising the steps of forming a pair of unitary, substantially homogeneous elements each having a precisely similar transverse cross section and L-shaped longitudinal cross section, and rigidly joining said elements symmetrically at the toes of said L-shaped cross sections to form a U-shaped tuning fork structure.

9. The method of forming a composite tuning fork comprising the steps of forming a pair of unitary, substantially homogeneous elements having a generally L-shaped longitudinal cross section with a plane surface at the toe of its L-shaped cross section, and rigidly joining said elements symmetrically at the toes of said L-shaped cross sections with said plane surfaces juxtaposed to form a U-shaped tuning fork structure.

10. A tuning fork having a pair of substantially parallel spaced tines joined at one end in a tine junction, comprising a pair of elements substantially unitary and homogeneous, each said element comprising a thin flexible tine part and a relatively thick rigid tine junction part, the relatively thick rigid tine junction parts of said pair of elements being substantially rigidly joined together with an intermediate flexible web member, which web member serves as part of a compliant mount for the tine junction portion of said tuning fork, the dimension of said tine junction part perpendicular to the plane of said tine part being at least two times the thickness of said tine part, and the dimension of said tine junction part in a direction parallel to the longitudinal axis of the tine part being at least three times the thickness of said tine part.

* * * * *